United States Patent
Kim et al.

(10) Patent No.: US 12,382,122 B2
(45) Date of Patent: Aug. 5, 2025

(54) ELECTRONIC APPARATUS FOR CONTROLLING PERIPHERAL DEVICE WITH REMOTE CONTROL SIGNAL AND CONTROL METHOD THEREOF

(71) Applicant: Samsung Electronics Co., Ltd., Suwon-si (KR)

(72) Inventors: Pyoungyun Kim, Suwon-si (KR); Sooin Kang, Suwon-si (KR); Haekwang Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 77 days.

(21) Appl. No.: 18/512,569

(22) Filed: Nov. 17, 2023

(65) Prior Publication Data

US 2024/0196039 A1     Jun. 13, 2024

Related U.S. Application Data

(63) Continuation of application No. PCT/KR2023/014152, filed on Sep. 19, 2023.

(30) Foreign Application Priority Data

Dec. 9, 2022     (KR) ........................ 10-2022-0171658

(51) Int. Cl.
  *H04N 21/422*     (2011.01)
  *H04N 7/025*      (2006.01)

(52) U.S. Cl.
  CPC ..... *H04N 21/42221* (2013.01); *H04N 7/0255* (2013.01)

(58) Field of Classification Search
  CPC ........... H04N 21/42221; H04N 7/0255; H04N 21/41265; H04N 21/42204;
  (Continued)

(56) References Cited

U.S. PATENT DOCUMENTS

| | | | |
|---|---|---|---|
| 5,228,077 | A | 7/1993 | Darbee |
| 5,255,313 | A | 10/1993 | Darbee |

(Continued)

FOREIGN PATENT DOCUMENTS

| | | |
|---|---|---|
| CN | 105338388 | 2/2016 |
| CN | 103634635 | 4/2019 |

(Continued)

OTHER PUBLICATIONS

Search Report and Written Opinion dated Jan. 17, 2024 issued in International Patent Application No. PCT/KR2023/014152.

*Primary Examiner* — John W Miller
*Assistant Examiner* — Omer Khalid
(74) *Attorney, Agent, or Firm* — Nixon & Vanderhye, P.C.

(57) ABSTRACT

Provided is an electronic apparatus comprising: a communication interface including communication circuitry; a memory; and at least one processor connected to the communication interface and the memory, and configured to control the electronic apparatus, wherein the processor is configured to: control the communication interface to transmit a channel signal to another electronic apparatus, control the communication interface to transmit an approval signal to the another electronic apparatus, based on the first cancellation signal being received from a remote control device through the communication interface, control the communication interface to transmit a second cancellation signal corresponding to the first cancellation signal to the another electronic apparatus, and based on the number of inputs of the first cancellation signal after transmitting the channel signal and the approval signal being a specified number of times or more, store information indicating that no approval signal is transmitted after transmitting the channel signal in the memory as usage pattern information.

15 Claims, 7 Drawing Sheets

(58) Field of Classification Search
CPC ......... H04N 21/4882; H04N 21/43615; H04N 21/4363; H04N 21/485
USPC .................................................. 348/569, 734
See application file for complete search history.

(56) References Cited

U.S. PATENT DOCUMENTS

| | | | |
|---|---|---|---|
| 5,414,761 | A | 5/1995 | Darbee |
| 5,451,953 | A | 9/1995 | Duffield |
| 5,515,052 | A | 5/1996 | Darbee |
| 5,684,526 | A * | 11/1997 | Yoshinobu ............. H04H 60/33 348/E7.071 |
| 5,959,751 | A | 9/1999 | Darbee et al. |
| 6,157,319 | A | 12/2000 | Johns et al. |
| 6,243,035 | B1 | 6/2001 | Walter et al. |
| 6,781,518 | B1 | 8/2004 | Hayes et al. |
| 6,998,997 | B2 | 2/2006 | Stevenson et al. |
| 7,119,710 | B2 | 10/2006 | Hayes et al. |
| 7,295,252 | B2 * | 11/2007 | Watanabe ........ H04N 21/42215 725/25 |
| 7,319,409 | B2 | 1/2008 | Hayes et al. |
| 7,429,979 | B2 | 9/2008 | Mears et al. |
| 7,952,467 | B2 | 5/2011 | Hardacker et al. |
| 8,078,560 | B2 | 12/2011 | Takata et al. |
| 8,429,309 | B2 | 4/2013 | Han et al. |
| 8,552,843 | B2 | 10/2013 | Dizechi et al. |
| 8,558,676 | B2 | 10/2013 | Hayes et al. |
| 9,124,917 | B2 | 9/2015 | Ahn |
| 9,978,263 | B2 | 5/2018 | Haughawout et al. |
| 10,964,186 | B2 | 3/2021 | Verma |
| 11,335,184 | B2 | 5/2022 | Kohanek et al. |
| 2004/0041712 | A1 | 3/2004 | Collovini et al. |
| 2008/0157996 | A1 | 7/2008 | Chen et al. |
| 2009/0248526 | A1 * | 10/2009 | Park ..................... G06Q 20/325 705/40 |
| 2009/0327816 | A1 | 12/2009 | Takata et al. |
| 2010/0053468 | A1 | 3/2010 | Harvill |
| 2010/0329688 | A1 | 12/2010 | Young |
| 2012/0106972 | A1 | 5/2012 | Liu |
| 2013/0070154 | A1 | 3/2013 | Ahn |
| 2013/0080892 | A1 | 3/2013 | Okajo |
| 2015/0179061 | A1 | 6/2015 | Kim et al. |
| 2015/0325109 | A1 | 11/2015 | Yu |
| 2020/0304990 | A1 * | 9/2020 | Azam ................... H04W 12/06 |
| 2022/0012157 | A1 | 1/2022 | Ankur |

FOREIGN PATENT DOCUMENTS

| | | |
|---|---|---|
| JP | 4769299 | 9/2011 |
| JP | 2022015778 A | 1/2022 |
| KR | 10-2013-0017897 | 2/2013 |
| KR | 10-2013-0029662 | 3/2013 |
| KR | 20150071944 A | 6/2015 |
| KR | 101884216 B1 | 8/2018 |
| KR | 10-2021-0027919 | 3/2021 |
| WO | 2011148719 A1 | 12/2011 |

* cited by examiner

ELECTRONIC APPARATUS FOR CONTROLLING PERIPHERAL DEVICE WITH REMOTE CONTROL SIGNAL AND CONTROL METHOD THEREOF

CROSS-REFERENCE TO RELATED APPLICATIONS

This application is a continuation of International Application No. PCT/KR2023/014152 designating the United States, filed on Sep. 19, 2023, in the Korean Intellectual Property Receiving Office and claiming priority to Korean Patent Application No. 10-2022-0171658, filed on Dec. 9, 2022, in the Korean Intellectual Property Office, the disclosures of each of which are incorporated by reference herein in their entireties.

BACKGROUND

Field

The disclosure relates to an electronic apparatus and a control method thereof, and for example, to an electronic apparatus for controlling a peripheral device with a remote control signal and a control method thereof.

Description of Related Art

In recent years, various peripheral devices such as a set-top box, a digital versatile disk (DVD) player, and a home theater have been used by being connected to a display device such as a television (TV). Accordingly, an integrated remote control function to control the peripheral devices using a remote control of the display device has been provided.

However, the display device may not accurately identify operations of the peripheral devices, and may not control the peripheral devices in consideration of the identified operations. The display device may receive a remote control signal and perform only operations of converting and transmitting the received remote control signal to the peripheral devices. In this process, a situation may occur in which a signal that does not match the operation of the peripheral device is delivered.

For example, the display device may control the peripheral device based on model information of the peripheral device and mapped remote control information, and may transmit a set key to the peripheral device using an infrared (IR) method of the integrated remote control. Here, an IR signal may refer to a one-way communication, and accordingly, the peripheral device may not be able to receive the IR signal or an unintended operation may occur. For example, most of the peripheral devices may check and process a current user interface (UI) menu for processing the IR signal for an enter key, or the set-top box may immediately perform channel tuning. Here, a specific peripheral device receiving the IR signal for the enter key may display a unique UI screen or perform a separate operation. In this case, a user's additional control may be required to turn off the UI screen again or to restore a state where the separate operation has been performed, which may cause inconvenience to the user.

In particular, a situation that does not match a user intention may occur in case that an integrated remote control module of the display device changes the remote control signal and provides the changed remote control signal. For example, as shown in FIG. 1, in case of receiving a channel number 123 from a specific application of the display device, the integrated remote control module of the display device may additionally provide 'enter' in addition to 123. In this case, the specific set-top box may switch a channel to correspond to 123, and then perform an operation of a function where a focus is positioned on an UI of the set-top box itself, which is displayed as default, thus covering the switched channel screen. The user may need to perform an additional control to clear this situation, which may increase user inconvenience.

SUMMARY

According to example embodiments of the disclosure, an electronic apparatus includes: a communication interface including communication circuitry: a memory: and at least one processor connected to the communication interface and the memory, and configured to control the electronic apparatus, wherein the processor is configured to: control the communication interface to transmit a channel signal to another electronic apparatus, control the communication interface to transmit an approval signal to the another electronic apparatus, based on a first cancellation signal being received from a remote control device through the communication interface, control the communication interface to transmit a second cancellation signal corresponding to the first cancellation signal to the another electronic apparatus, and based on a number of inputs of the first cancellation signal after transmitting the channel signal and the approval signal being a specified number of times or more, store information indicating that no approval signal is transmitted after transmitting the channel signal in the memory as usage pattern information.

The apparatus according to example embodiments may further comprise: a display, wherein the processor is configured to: control the display to display at least one thumbnail corresponding to at least one content, and control the communication interface to transmit the channel signal indicating a channel corresponding to the thumbnail selected based on a received signal to another electronic apparatus based on receiving the signal for selecting one of the at least one thumbnail from the remote control device through the communication interface.

The processor according to example embodiments may be further configured to: control the communication interface to transmit the channel signal indicating a channel corresponding to the thumbnail selected based on a re-received signal to another electronic apparatus based on re-receiving the signal for selecting one of the at least one thumbnail from the remote control device through the communication interface in a state where the usage pattern information is stored in the memory, and transmit no approval signal based on the usage pattern information.

The processor according to example embodiments may be further configured to: receive signals based on manipulation of number buttons of a specified number or more among the plurality of number buttons included in the remote control device from the remote control device through the communication interface, and control the communication interface to transmit signals corresponding to the signals based on the manipulation of the number buttons of the specified number or more to another electronic apparatus as the channel signals.

The processor according to example embodiments may be further configured to: re-receive the signals based on the manipulation of the number buttons of the specified number or more among the plurality of number buttons from the remote control device through the communication interface in the state where the usage pattern information is stored in the memory, control the communication interface to transmit signals corresponding to the re-received signals to another electronic apparatus as the channel signals, and transmit no approval signal based on the usage pattern information.

A difference in reception time points of the adjacent signals among the signals based on the manipulation of the number buttons of the specified number or more is a specified value or less.

The apparatus according to example embodiments may further comprise: a display, wherein the processor is configured to: control the display to display a focus on at least one thumbnail corresponding to at least one content and one of the at least one thumbnail, and control the communication interface to transmit the channel signal indicating a channel corresponding to a thumbnail where the focus is positioned to another electronic apparatus based on the focus being displayed on one of the at least one thumbnail for a predetermined time or more.

The processor according to example embodiments may be configured to: control the communication interface to transmit the channel signal indicating the channel corresponding to the thumbnail where the focus is positioned to another electronic apparatus based on the focus being displayed on one of the at least one thumbnail for the specified time or more in the state where the usage pattern information is stored in the memory, and transmit no approval signal based on the usage pattern information.

The apparatus according to example embodiments may further comprise: a display, wherein the processor is configured to: control the display to display a screen asking whether to store the usage pattern information, and store the usage pattern information in the memory based on receiving a storage approval signal from the remote control device through the communication interface.

The approval signal may include a signal corresponding to a signal based on at least one of the input button, ok button, or enter button of the remote control device, and the first cancellation signal may include a signal corresponding to a signal based on at least one of the cancel button, back button, return button, or exit button of the remote control device.

The processor according to example embodiments may be further configured to: receive the first cancellation signal from the remote control device according to a first communication standard of the communication interface, and transmit the channel signal, the approval signal, and the second cancellation signal to another electronic apparatus according to a second communication standard of the communication interface.

According to example embodiments of the disclosure, a method of controlling an electronic apparatus includes: transmitting a channel signal to another electronic apparatus; transmitting an approval signal to the another electronic apparatus; based on a first cancellation signal being received from a remote control device, transmitting a second cancellation signal corresponding to the first cancellation signal to the another electronic apparatus; and based on a number of inputs of the first cancellation signal after the channel signal and the approval signal are transmitted being a specified number of times or more, storing information indicating that no approval signal is transmitted after the channel signal is transmitted as usage pattern information.

The method according to example embodiments may further comprise: displaying at least one thumbnail corresponding to at least one content, wherein in the transmitting of the channel signal to another electronic apparatus, the channel signal indicating a channel corresponding to the thumbnail selected based on a received signal is transmitted to another electronic apparatus based on the signal for selecting one of the at least one thumbnail being received from the remote control device.

The method according to example embodiments may further comprise: transmitting the channel signal indicating a channel corresponding to the thumbnail selected based on a re-received signal to another electronic apparatus based on the signal for selecting one of the at least one thumbnail being re-received from the remote control device in a state where the usage pattern information is stored; and transmitting no approval signal based on the usage pattern information.

The method according to example embodiments may further comprise: receiving signals based on manipulation of number buttons of a specified number or more among the plurality of number buttons included in the remote control device from the remote control device, wherein in the transmitting of the channel signal to another electronic apparatus, signals corresponding to the signals based on the manipulation of the number buttons of the specified number or more are transmitted to another electronic apparatus as the channel signals.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
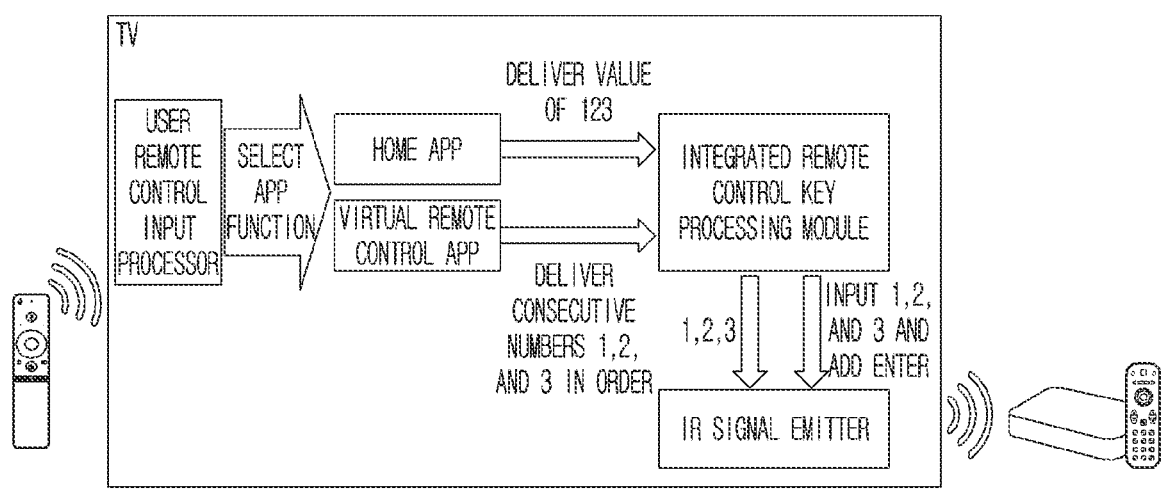
FIG. 1 is a diagram illustrating an example control method of a peripheral device to assist in understanding the disclosure.

The various example embodiments of the present disclosure may be diversely modified. Accordingly, various example embodiments are illustrated in the drawings and are described in greater detail in the detailed description. However, it is to be understood that the present disclosure is not limited to a specific example embodiment, but includes all modifications, equivalents, and substitutions without departing from the scope and spirit of the present disclosure. Also, well-known functions or constructions may not be described in detail where they would obscure the disclosure with unnecessary detail.

The disclosure provides an electronic apparatus which may correct an operation that does not match a user intention generated in a process of controlling a peripheral device, and a control method thereof.

Hereinafter, the disclosure is described in greater detail with reference to the accompanying drawings.

General terms that are currently widely used are selected as terms used in embodiments of the disclosure in consideration of their functions in the disclosure, and may be changed based on the intention of those skilled in the art or a judicial precedent, the emergence of a new technique, or the like. In addition, in a specific case, arbitrarily chosen terms may exist. In this case, the meanings of such terms are mentioned in detail in corresponding descriptions of the disclosure. Therefore, the terms used in the disclosure should be defined on the basis of the meanings of the terms and the contents throughout the disclosure rather than simple names of the terms.

In the disclosure, an expression "have," "may have," "include," "may include" or the like, indicates the existence of a corresponding feature (for example, a numerical value, a function, an operation or a component such as a part), and does not exclude the existence of an additional feature.

An expression, "at least one of A or/and B" may indicate either "A or B," or "both of A and B."

Expressions "first," "second," and the like, used in the disclosure may indicate various components regardless of the sequence or importance of the components. These expressions are used simply to distinguish one component from another component, and do not limit the corresponding components.

A term of a singular number may include its plural number unless explicitly indicated otherwise in the context. It is to be understood that a term "include," "formed of," or the like used in the application specifies the presence of features, numerals, steps, operations, components, parts, or combinations thereof, mentioned in the disclosure, and does not preclude the presence or addition of one or more other features, numerals, steps, operations, components, parts, or combinations thereof.

In the disclosure, such a term as a "user" may refer to a person who uses the electronic apparatus or an apparatus (for example, an artificial intelligence electronic apparatus) which uses the electronic apparatus.

Hereinafter, various example embodiments of the disclosure are described in greater detail with reference to the accompanying drawings.

Figure 2:
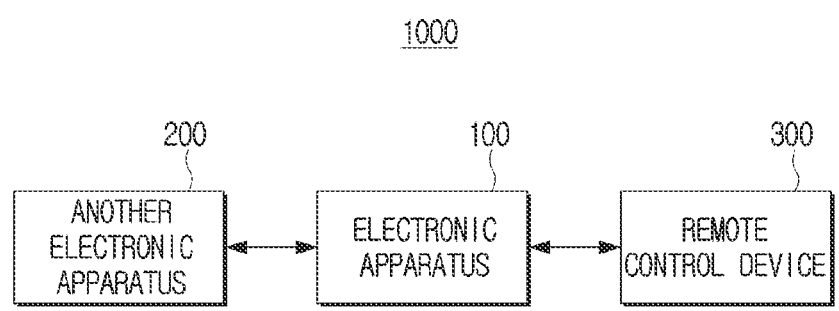
FIG. 2 is a block diagram illustrating an example configuration of an electronic system according to various embodiments.

FIG. 2 is a block diagram illustrating an example configuration of an electronic system 1000 according to various embodiments. As shown in FIG. 2, the electronic system 1000 may include an electronic apparatus 100, another electronic apparatus 200, and a remote control device 300.

The electronic apparatus 100 may communicate with another electronic apparatus 200 and the remote control device 300, and transmit a control signal for controlling another electronic apparatus 200 to another electronic apparatus 200 based on the control signal received from the remote control device 300. For example, the electronic apparatus 100 may, for example, and without limitation, be a device such as a television (TV), a digital signage, a computer, a laptop computer, a tablet personal computer (PC), a monitor, a smartphone, a wearable device, or the like. However, the electronic apparatus 100 is not limited thereto, and may be any device as long as the electronic apparatus 100 controls another electronic apparatus 200 based on the signal received from the remote control device 300.

The electronic apparatus 100 may control another electronic apparatus 200 by adding an additional signal to the signal received from the remote control device 300. For example, the electronic apparatus 100 may control another electronic apparatus 200 by adding an enter signal to the signal received from the remote control device 300.

The electronic apparatus 100 may not additionally perform the additional signal based on a user's control pattern. For example, the electronic apparatus 100 may transmit the signal received from the remote control device 300 and the enter signal to another electronic apparatus 200, and then repeatedly receive a return signal from the user. In this case, the electronic apparatus 100 may transmit only the signal received from the remote control device 300 to another electronic apparatus 200 without transmitting the enter signal.

Another electronic apparatus 200 may be a device that receives the control signal from the electronic apparatus 100, and may be, for example, a set-top box that provides a content to the electronic apparatus 100. However, another electronic apparatus 200 is not limited thereto, and may be any device as long as another electronic apparatus 200 receives the control signal from the electronic apparatus 100.

The remote control device 300 may be a device that transmits the control signal for controlling another electronic apparatus 200 to the electronic apparatus 100. For example, the remote control device 300 may be a remote control for controlling the electronic apparatus 100 and another electronic apparatus 200. However, the remote control device 300 is not limited thereto, and may be any device as long as the remote control device 300 controls at least one of the electronic apparatus 100 or another electronic apparatus 200. For example, the remote control device 300 may be a smartphone on which an application for controlling at least one of the electronic apparatus 100 or another electronic apparatus 200 is installed.

The remote control device 300 may transmit the control signal of a first communication standard to the electronic apparatus 100. Here, in case of receiving the content from another electronic apparatus 200, the electronic apparatus 100 may change the signal of the first communication standard into a signal of a second communication standard and transmit the same to another electronic apparatus 200. On the other hand, in case of receiving no content from another electronic apparatus 200, the electronic apparatus 100 may change an operation mode of the electronic apparatus 100 based on the signal of the first communication standard. For example, the electronic apparatus 100 may identify a control target of the control signal received from the remote control device 300 based on its connection relationship with another electronic apparatus 200.

Hereinabove, the description briefly describes the operations of the electronic apparatus 100, another electronic apparatus 200, and the remote control device 300 that are included in the electronic system 1000. Hereinafter, the description describes the operation of the electronic apparatus 100 in greater detail.

Figure 3:
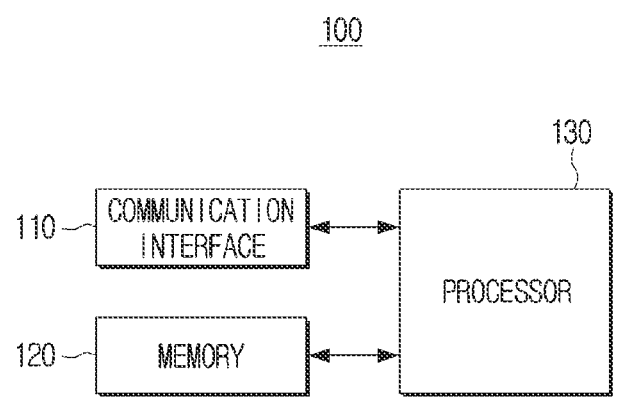
FIG. 3 is a block diagram illustrating an example configuration of an electronic apparatus according to various embodiments.

FIG. 3 is a block diagram illustrating an example configuration of the electronic apparatus 100 according to various embodiments. Referring to FIG. 3, the electronic apparatus 100 may include a communication interface (e.g., including communication circuitry) 110, a memory 120, and a processor (e.g., including processing circuitry) 130.

The communication interface 110 is a component including various communication circuitry for communicating with various types of external devices using various types of communication methods. For example, the electronic apparatus 100 may communicate with another electronic apparatus 200 and the remote control device 300 through the communication interface 110.

The communication interface 110 may include a wireless-fidelity (Wi-Fi) module, a Bluetooth module, an infrared communication module, a wireless communication module, or the like. Here, each communication module may be implemented in the form of at least one hardware chip.

The Wi-Fi module and the Bluetooth module may respectively perform the communication in a Wi-Fi manner and a Bluetooth manner. In case of using the Wi-Fi module or the Bluetooth module, the communication interface 110 may first transmit and receive various connection information such as a service set identifier (SSID) or a session key, connect the communication using this connection information, and then transmit and receive various information. The infrared communication module may perform the communication based on infrared data association (IrDA) technology that wirelessly transmits data in a short distance using an infrared ray between visible light and millimeter waves.

In addition to the above-described communication methods, the wireless communication module may include at least one communication chip performing the communication based on various wireless communication standards such as zigbee, third generation (3G), third generation partnership project (3GPP), long term evolution (LTE), LTE advanced (LTE-A), fourth generation (4G), and fifth generation (5G).

The communication interface 110 may include a wired communication interface such as a high definition multimedia interface (HDMI), a display port (DP), a thunderbolt, a universal serial bus (USB), a red-green-blue (RGB) port, a D-subminiature (D-SUB), a digital visual interface (DVI), or the like.

The communication interface 110 may include at least one of wired communication modules performing the communication using a local area network (LAN) module, an Ethernet module, a pair cable, a coaxial cable, an optical fiber cable, or the like.

The memory 120 may refer to hardware storing information such as data in an electrical or magnetic form for the processor 130 or the like to access the data. To this end, the memory 120 may be implemented as a non-volatile memory, a volatile memory, a flash memory, a hard disk drive (HDD), a solid state drive (SSD), a random access memory (RAM), a read only memory (ROM), or the like.

The memory 120 may store at least one instruction necessary for operating the electronic apparatus 100 or the processor 130. Here, the instruction ma include a code unit indicating the operation of the electronic apparatus 100 or the processor 130, and may be written in a machine language, which is a language that a computer may understand. Alternatively, the memory 120 may store the plurality of instructions for performing a specific task of the electronic apparatus 100 or the processor 130 as an instruction set.

The memory 120 may store information which is data in units of bits or bytes and may represent characters, numbers, images, or the like. For example, the memory 120 may store usage pattern information.

The memory 120 may be accessed by the processor 130, and the processor 130 may perform the readout, recording, correction, deletion, update, or the like of the instructions, the instruction set, or the data.

The processor 130 may include various processing circuitry and control overall operations of the electronic apparatus 100. For example, the processor 130 may be connected to each component of the electronic apparatus 100 to thus control the overall operations of the electronic apparatus 100. For example, the processor 130 may be connected to the components such as the communication interface 110, the memory 120, and a display (not shown) to control the operation of the electronic apparatus 100.

At least one processor 130 may include, for example, and without limitation, at least one of a central processing unit (CPU), a graphics processing unit (GPU), an accelerated processing unit (APU), a many integrated core (MIC), a neural processing unit (NPU), a hardware accelerator, a machine learning accelerator, or the like. At least one processor 130 may control one of other components of the electronic apparatus 100 or any combination thereof, and perform operations related to the communication or data processing. At least one processor 130 may execute at least one program or instruction stored in the memory. For example, at least one processor may perform a method according to various embodiments of the disclosure by executing at least one instruction stored in the memory.

A plurality of operations may be performed by one processor or may be performed by a plurality of processors in case that the method according to various embodiments of the disclosure includes the plurality of operations. For example, a first operation, a second operation, and a third operation may be performed by the method according to other embodiments. In this case, the first operation, the second operation, and the third operation may all be performed by a first processor. Alternatively, or the first operation and the second operation may be performed by the first processor (for example, a general-purpose processor), and the third operation may be performed by a second processor (for example, an artificial intelligence-only processor).

At least one processor 130 may be implemented as a single core processor including one core, or may be implemented as at least one multicore processor including multicores (e.g., homogeneous multicores or heterogeneous multicores). In case that at least one processor 130 is implemented as the multicore processor, each of the multicores included in the multicore processor may include a processor internal memory such as a cache memory or an on-chip memory, and a common cache shared by the multicores may be included in the multicore processor. In addition, each of the multicores included in the multicore processor (or some of the multicores) may independently read and perform a program instruction for implementing the method according to various embodiments of the disclosure, or all (or some) of the multicores may be linked with each other to read and perform the program instruction for implementing the method according to various embodiments of the disclosure.

In case that the method according to various embodiments of the disclosure includes a plurality of operations, the plurality of operations may be performed by one core among the multicores included in the multicore processor, or may be performed by the multicores. For example, in case that the first operation, the second operation, and the third operation are performed by the method according to various embodiments, the first operation, the second operation, and the third operation may all be performed by a first core included in the multicore processor. The first operation and the second operation may be performed by the first core included in the multicore processor, and the third operation may be performed by a second core included in the multicore processor.

In the embodiments of the disclosure, at least one processor 130 may refer to a system-on-chip (SoC) in which at least one processor and other electronic components are integrated, the single core processor, the multicore processor, or a core included in the single core processor or the multicore processor. Here, the core may be implemented as the CPU, the GPU, the APU, the MIC, the NPU, the hardware accelerator, or the machine learning accelerator. However, the embodiments of the disclosure are not limited thereto. However, for convenience of description, the operation of the electronic apparatus 100 is hereinafter described with the expression "the processor 130".

The processor 130 may control the communication interface 110 to transmit a channel signal to another electronic apparatus 200, and control the communication interface 110 to transmit an approval signal to another electronic apparatus 200. For example, in case that a channel is changed under user control, the processor 130 may control the communication interface 110 to transmit the channel signal to another electronic apparatus 200 and additionally transmit the approval signal to another electronic apparatus 200. Here, the approval signal may be a signal that is not controlled by the user, and a signal automatically added by the electronic apparatus 100 for user convenience. In addition, the approval signal may be a signal corresponding to a signal based on at least one of the input button, ok button, or enter button of the remote control device 300. For example, the ok button of the remote control device 300 may be operated, and the remote control device 300 may thus transmit a signal corresponding to the ok button to the electronic apparatus 100. In this case, the electronic apparatus 100 may transmit the control signal to another electronic apparatus 200 based on the signal corresponding to the ok button, and the control signal transmitted to another electronic apparatus 200 may here be the same as the approval signal.

The processor 130 may control the communication interface 110 to transmit a second cancellation signal corresponding to a first cancellation signal to another electronic apparatus 200 in case of receiving the first cancellation signal from the remote control device 300 through the communication interface 110. Here, the first cancellation signal may be a signal corresponding to a signal based on at least one of the cancel button, back button, return button, or exit button of the remote control device 300.

The processor 130 may store information indicating that no approval signal is transmitted after transmitting the channel signal in the memory 120 as the usage pattern information in case that the number of inputs of the first cancellation signal after transmitting the channel signal and the approval signal is a predetermined number of times or more. For example, in case of receiving the first cancellation signal after transmitting the channel signal and the approval signal, the processor 130 may store this history in the memory 120. The processor 130 may identify whether this operation is repeated, and the history is stored in the memory 120 a predetermined number of times or more. In case that the number of times the first cancellation signal is input after transmitting the channel signal and the approval signal is the predetermined number of times or more, the processor 130 may store the information indicating that no approval signal is transmitted after transmitting the channel signal in the memory 120 as the usage pattern information. That is, the processor 130 may identify that the approval signal automatically transmitted may cause the user inconvenience, and may generate the usage pattern information indicating that the approval signal is not transmitted after transmitting the channel signal. After storing the usage pattern information, the processor 130 may not transmit the approval signal even though the channel signal is transmitted.

Here, a time point at which the first cancellation signal is received from a time point at which the approval signal is transmitted may be within a predetermined time point. For example, the processor 130 may update the history stored in the memory 120 in case of receiving the first cancellation signal within a predetermined time from the time at which the approval signal is transmitted, and maintain the history stored in the memory 120 without updating in case of receiving the first cancellation signal after the predetermined time from the time at which the approval signal is transmitted.

The electronic apparatus 100 may further include a display (refer to FIG. 4), and the processor 130 may control the display to display at least one thumbnail corresponding to at least one content, and control the communication interface 110 to transmit the channel signal indicating a channel corresponding to the thumbnail selected based on a received signal to another electronic apparatus 200 in case of receiving the signal for selecting one of at least one thumbnail from the remote control device 300 through the communication interface 110. The processor 130 may then transmit the approval signal, and may generate the usage pattern information based on the history stored in the memory 120 in case of receiving the first cancellation signal from the remote control device 300.

The processor 130 may control the communication interface 110 to transmit the channel signal indicating a channel corresponding to the thumbnail selected based on a re-received signal to another electronic apparatus 200 in case of re-receiving the signal for selecting one of at least one thumbnail from the remote control device 300 through the communication interface 110 in a state where the usage pattern information is stored in the memory 120, and transmit no approval signal based on the usage pattern information.

The processor 130 may receive signals based on manipulation of number buttons of a predetermined number or more among the plurality of number buttons included in the remote control device 300 from the remote control device 300 through the communication interface 110, and control the communication interface 110 to transmit signals corresponding to the signals based on the manipulation of the number buttons of the predetermined number or more to another electronic apparatus 200 as the channel signals. Here, a difference in reception time points of adjacent signals among the signals based on the manipulation of the number buttons of the predetermined number or more may be a predetermined value or less. The processor 130 may then transmit the approval signal, and may generate the usage pattern information based on the history stored in the memory 120 in case of receiving the first cancellation signal from the remote control device 300.

The processor 130 may re-receive the signals based on the manipulation of the number buttons of the predetermined number or more among the plurality of number buttons from the remote control device 300 through the communication interface 110 in the state where the usage pattern information is stored in the memory 120, control the communication interface 110 to transmit signals corresponding to the re-received signals to another electronic apparatus 200 as the channel signals, and transmit no approval signal based on the usage pattern information.

The electronic apparatus 100 may further include a display (refer to FIG. 4), and the processor 130 may control the display to display a focus on at least one thumbnail corresponding to at least one content and one of at least one thumbnail, and control the communication interface 110 to transmit the channel signal indicating a channel corresponding to a thumbnail where the focus is positioned to another electronic apparatus 200 in case that the focus is displayed on one of at least one thumbnail for a predetermined time or more. The processor 130 may then transmit the approval signal, and may generate the usage pattern information based on the history stored in the memory 120 in case of receiving the first cancellation signal from the remote control device 300.

The processor 130 may control the communication interface 110 to transmit the channel signal indicating the channel corresponding to the thumbnail where the focus is positioned to another electronic apparatus 200 in case that the focus is displayed on one of at least one thumbnail for the predetermined time or more in the state where the usage pattern information is stored in the memory 120, and transmit no approval signal based on the usage pattern information.

The processor 130 may receive the first cancellation signal from the remote control device 300 according to the first communication standard of the communication interface 110, and transmit the channel signal, the approval signal, and the second cancellation signal to another electronic apparatus 200 according to the second communication standard of the communication interface 110. For example, the processor 130 may receive the first cancellation signal from the remote control device 300 according to a Bluetooth standard, and transmit the channel signal, the approval signal, and the second cancellation signal to another electronic apparatus 200 according to an infrared data association (IrDA) standard. That is, the processor 130 may transmit an infrared communication standard signal to another electronic apparatus 200 based on a Bluetooth standard signal received from the remote control device 300.

The processor 130 may identify the signal received from the remote control device 300 as the signal for controlling another electronic apparatus 200 in case of receiving the content from another electronic apparatus 200. For example, in case of receiving the control signal based on input of the number button from the remote control device 300, the processor 130 may identify the signal as the signal for controlling another electronic apparatus 200 while receiving the content from another electronic apparatus 200, and identify the signal as a signal for controlling the electronic apparatus 100 while receiving no content from another electronic apparatus 200. That is, the processor 130 may convert the communication standard of the control signal, and provide the control signal of the converted communication standard to another electronic apparatus 200 in case of receiving the control signal based on the input of the number button from the remote control device 300 while receiving the content from another electronic apparatus 200. On the other hand, the processor 130 may change the operation mode of the electronic apparatus 100 based on the control signal in case of receiving the control signal based on the input of the number button from the remote control device 300 while receiving no content from another electronic apparatus 200.

Meanwhile, the electronic apparatus 100 may further include a display (refer to FIG. 4), and the processor 130 may control the display to display a screen asking whether to store the usage pattern information, and store the usage pattern information in the memory 120 in case of receiving a storage approval signal from the remote control device 300 through the communication interface 110. The electronic apparatus 100 may further include a user interface (refer to FIG. 4). Here, the processor 130 may store the usage pattern information in the memory 120 in case of receiving a user command for the storage approval through the user interface. Alternatively, the electronic apparatus 100 may further include a microphone. Here, the processor 130 may output a message asking whether to store the usage pattern information through the microphone.

Meanwhile, the description describes hereinabove that the usage pattern information is information indicating that no approval signal is transmitted after the channel signal is transmitted. However, the usage pattern information is not limited thereto. For example, the usage pattern information may be information indicating that the approval signal and the second cancellation signal are transmitted after the channel signal is transmitted.

In addition, the usage pattern information may be generated in such a way that an operation is added based on the user's usage pattern. For example, an operation of transmitting the approval signal may also be a type of the usage pattern information generated based on the user's usage pattern. For example, the processor 130 may control the communication interface 110 to transmit the channel signal to another electronic apparatus 200, control the communication interface 110 to transmit a second approval signal corresponding to a first approval signal to another electronic apparatus 200 in case of receiving the first approval signal from the remote control device 300 through the communication interface 110, and store information indicating that the first approval signal is transmitted after transmitting the channel signal in the memory 120 as the usage pattern information in case of receiving the number of times the first approval signal after transmitting the channel signal is the predetermined number of times or more. Here, the channel signal may be stored in the usage pattern information as the manipulation of the number buttons of the predetermined number. For example, the processor 130 may generate the usage pattern information in case of receiving a control signal based on manipulation of three number buttons from the remote control device 300, receiving the first approval signal, transmitting a channel signal corresponding to the three number buttons and the second approval signal corresponding to the first approval signal to another electronic apparatus 200, and receiving the number of times the first approval signal after transmitting the channel signal is the predetermined number of times or more. The processor 130 may then transmit the channel signal and the second approval signal corresponding to three random number buttons to another electronic apparatus 200 in case of receiving the control signal based on the operation of three random number buttons from the remote control device 300. Through this operation, the usage pattern information indicating that the second approval signal is transmitted may be generated even in case that a number button different from a previously input number button is manipulated.

Meanwhile, the processor 130 may transmit the usage pattern information to a server. The server may be in a state of storing the plurality of usage pattern information received from the plurality of electronic apparatuses. In case that the user's usage pattern is one of the usage patterns stored in the server, the processor 130 may adjust the predetermined number of times, which is a criterion for generating the usage pattern information For example, the processor 130 may lower the predetermined number of times in case that the user's usage pattern is one of the usage patterns stored in the server. In addition, the processor 130 may adjust the predetermined number of times based on a frequency of the usage pattern stored in the server in case that the user's usage pattern is one of the usage patterns stored in the server.

For example, the processor 130 may change the predetermined number of times to be lower in case that the frequency of the corresponding usage pattern stored in the server is high compared to a case where the frequency is low.

Meanwhile, the description describes hereinabove that the usage pattern information is generated based on a rule, and is not limited thereto. For example, the processor 130 may acquire the usage pattern information using a neural network model. For example, the processor 130 may learn the neural network model based on the signal from the remote control device 300 that is received at a predetermined time interval. In case of receiving the signal from the remote control device 300 at the predetermined time interval, the processor 130 may then identify an expected signal to be input next by inputting the same to the neural network model, and may perform an operation corresponding to the identified expected signal.

Meanwhile, functions related to an artificial intelligence according to the disclosure may be operated through the processor 130 and the memory 120.

The processor 130 may include at least one processor. Here, at least one processor may include, for example, and without limitation, the general-purpose processor such as the central processing unit (CPU), an application processor (AP), a digital signal processor (DSP), a graphics-only processor such as the graphic processing unit (GPU), a vision processing unit (VPU), an artificial intelligence-only processor such as the neural processing unit (NPU), or the like.

At least one processor may control input data to be processed based on a predefined operation rule or an artificial intelligence model, stored in the memory 120. Alternatively, at least one processor may be the AI-only processor, and in this case, the AI-only processor may be designed to have a hardware structure specialized for processing a specific AI model. The predefined operation rule or the artificial intelligence model may be acquired by learning.

Here, to be acquired by the learning may indicate that a basic artificial intelligence model performs the learning using a number of learning data, based on the learning algorithm, thereby acquiring the predefined operation rule or artificial intelligence model, set to perform a desired feature (or purpose). Such learning may be performed by a machine itself in which the artificial intelligence is performed according to the disclosure, or by a separate server/system. An example of the learning algorithm may include, supervised learning, unsupervised learning, semi-supervised learning, or reinforcement learning, and is not limited thereto.

The artificial intelligence model may include a plurality of neural network layers. The plurality of neural network layers may each have a plurality of weight values, and perform a neural network operation using an operation between an operation result of a previous layer and the plurality of weights. The plurality of weights of the plurality of neural network layers may be optimized by a learning result of the artificial intelligence model. For example, the plurality of weights may be updated to reduce or minimize a loss value or a cost value, acquired by the artificial intelligence model during a learning process.

An artificial neural network may include a deep neural network (DNN), may include, for example, and without limitation, a convolutional neural network (CNN), the deep neural network (DNN), a recurrent neural network (RNN), a restricted Boltzmann machine (RBM), a deep belief network (DBN), a bidirectional recurrent deep neural network (BRDNN), a generative adversarial network (GAN), a deep q-network, or the like, and is not limited thereto.

Figure 4:
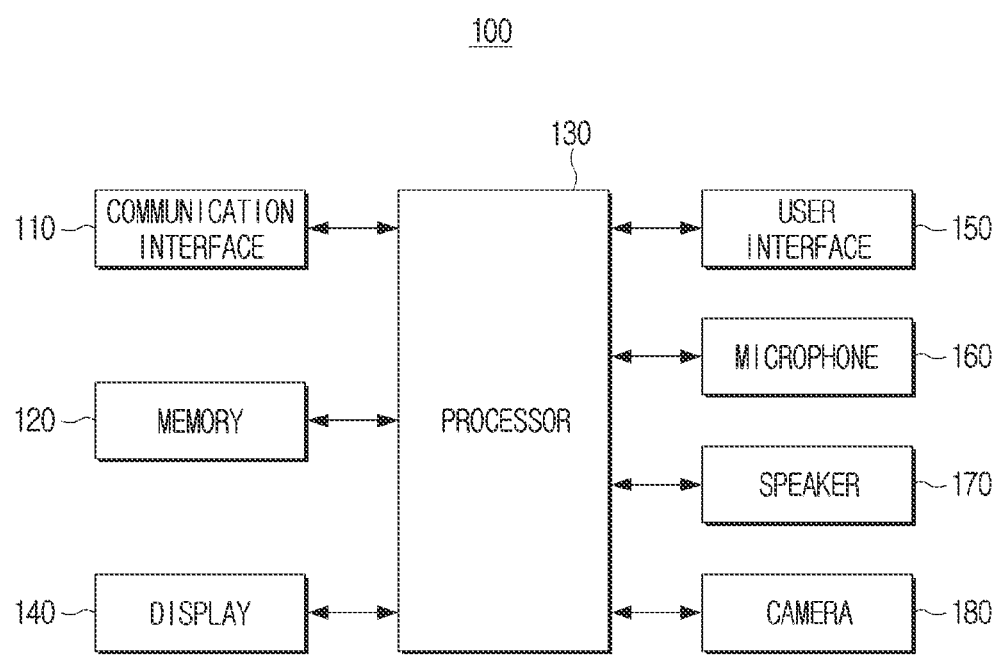
FIG. 4 is a block diagram illustrating an example configuration of the electronic apparatus according to various embodiments.

FIG. 4 is a block diagram illustrating an example configuration of the electronic apparatus 100 according to various embodiments.

Referring to FIG. 4, the electronic apparatus 100 may include the communication interface (e.g., including communication circuitry) 110, the memory 120, and the processor (e.g., including processing circuitry) 130. In addition, referring to FIG. 4, the electronic apparatus 100 may further include a display 140, a user interface (e.g., including user interface circuitry) 150, a microphone 160, a speaker 170, and a camera 180. The description may not repeated descriptions of components that are the same as or similar to the components shown in FIG. 3 among the components shown in FIG. 4.

The display 140 may include a component displaying an image, and may be implemented as various types of displays such as, for example, and without limitation, a liquid crystal display (LCD), an organic light emitting diode (OLED) display, a plasma display panel (PDP), or the like. The display 140 may also include a driving circuit, a backlight unit and the like, which may be implemented in a form such as an a-si thin film transistor (TFT), a low temperature poly silicon (LTPS) TFT, or an organic TFT (OTFT). Meanwhile, the display 140 may be implemented as a touch screen combined with a touch sensor, a flexible display, a three-dimensional (3D) display, or the like.

The user interface 150 may include various circuitry and be implemented as a button, a touch pad, a mouse or a keyboard, or may be implemented as a touch screen which may perform both a display function and a manipulation input function. Here, the button may be any of various types of buttons such as a mechanical button, a touch pad, or a wheel, which is positioned on any region of a body appearance of the electronic apparatus 100, such as its front surface, side surface, or rear surface.

The microphone 160 is a component receiving a sound and converting the same into an audio signal. The microphone 160 may be electrically connected to the processor 130, and may receive the sound under the control of the processor 130.

For example, the microphone 160 may be integrated with the electronic apparatus 100 in the upper, front, or side direction of the electronic apparatus 100. Alternatively, the microphone 160 may be positioned on a remote control or the like, separate from the electronic apparatus 100. In this case, the remote control may receive the sound through the microphone 160, and provide the received sound to the electronic apparatus 100.

The microphone 160 may include various components such as a microphone collecting the sound in an analog form, an amplifier circuit amplifying the collected sound, an analog to digital (A/D) conversion circuit sampling the amplified sound and converting the same into a digital signal, and a filter circuit removing a noise component from the converted digital signal.

Meanwhile, the microphone 160 may be implemented in the form of a sound sensor, and may use any method by which the sound may be collected.

The speaker 170 may include a component outputting various notification sounds, an audio message, or the like, as well as various audio data processed by the processor 130.

The camera 180 may include a component capturing a still image or a moving image. The camera 180 may capture the still image at a specific time point, and may also continuously capture the still images.

The camera 180 may include a lens, a shutter, an aperture, a solid-state imaging device, an analog front end (AFE), and a timing generator (TG). The shutter may adjust time at which light reflected from a subject enters the camera 180, and the aperture may mechanically increase or decrease a size of an opening through which light enters, thereby controlling an amount of light incident on the lens. The solid-state imaging device may output the image by photoelectric charge as an electrical signal in case that light reflected by the subject is accumulated as the photoelectric charge. The TG may output a timing signal for reading out pixel data of the solid-state imaging device, and the AFE may sample and digitize the electrical signal output from the solid-state imaging device.

As described above, according to the various embodiments of the disclosure, the electronic apparatus 100 may automatically perform correction for the unintended operation of another electronic apparatus 200, thereby improving the user convenience. In addition, the electronic apparatus 100 may receive confirmation from the user before generating the usage pattern information for the correction, thereby preventing and/or reducing erroneous correction in advance.

Hereinafter, the description describes the operation of the electronic apparatus 100 in greater detail with reference to FIGS. 5 and 6. The description describes various example embodiments for convenience of description with reference to FIGS. 5 and 6. However, the example embodiments described with reference to FIGS. 5 and 6 may be implemented in any combination thereof.

Figure 5:
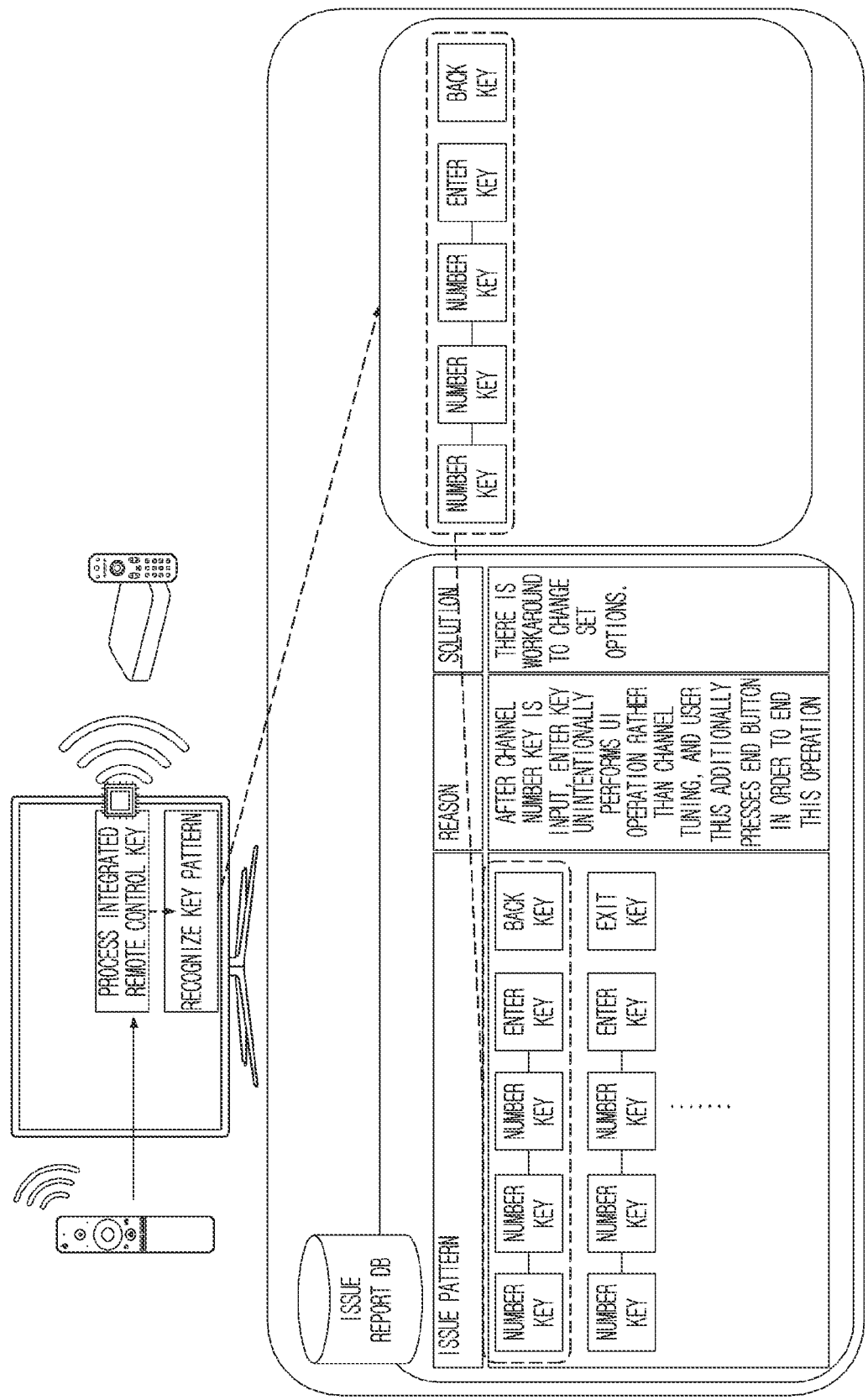
FIG. 5 is a diagram illustrating an example method of using a database of a server according to various embodiments.

FIG. 5 is a diagram illustrating an example method of using a database of a server according to various embodiments.

The processor 130 may store the usage pattern information in the memory 120, and control the communication interface 110 to transmit the usage pattern information to the server. Hereinafter, for convenience of description, the usage pattern information is described as first usage pattern information.

The server may be in a state of storing the plurality of usage pattern information received from the plurality of electronic apparatuses. The server may update a frequency of the first usage pattern information in case of receiving the first usage pattern information from the electronic apparatus 100.

The processor 130 may control the communication interface 110 to transmit the usage pattern to the server. For example, in case that a predetermined button of the remote control device 300 is manipulated, the processor 130 may receive a first control signal corresponding to the predetermined button from the remote control device 300 through the communication interface 110. In this case, the processor 130 may transmit information on at least one second control signal and the first control signal transmitted to another electronic apparatus 200 to the server for a predetermined time before receiving the first control signal. For example, as shown in FIG. 5, in case of receiving the first control signal corresponding to the back button of the remote control device 300, the processor 130 may transmit information on the three number buttons, the enter button, and the back button transmitted to another electronic apparatus 200 to the server for the predetermined time before receiving the first control signal. Here, the predetermined button may include at least one of the input button, ok button, enter button, cancel button, return button, or exit button of the remote control device 300.

The processor 130 may receive a frequency of the usage pattern transmitted to the server from the server. The processor 130 may generate the usage pattern information or change the predetermined number of times based on the frequency of the received usage pattern.

For example, the processor 130 may immediately generate the usage pattern information corresponding to the usage pattern in case that the frequency of the received usage pattern is a predetermined first number of times or more. Alternatively, the processor 130 may lower the predetermined number of times, which is a criterion for generating the usage pattern information, by a predetermined rate in case that the frequency of the received usage pattern is less than the predetermined first number of times and is a predetermined second number of times or more. Alternatively, the processor 130 may not perform any separate operation in case that the frequency of the received usage pattern is less than the predetermined second number of times. However, the frequency of the usage pattern is not limited thereto, and may be implemented in various ways.

Figure 6:
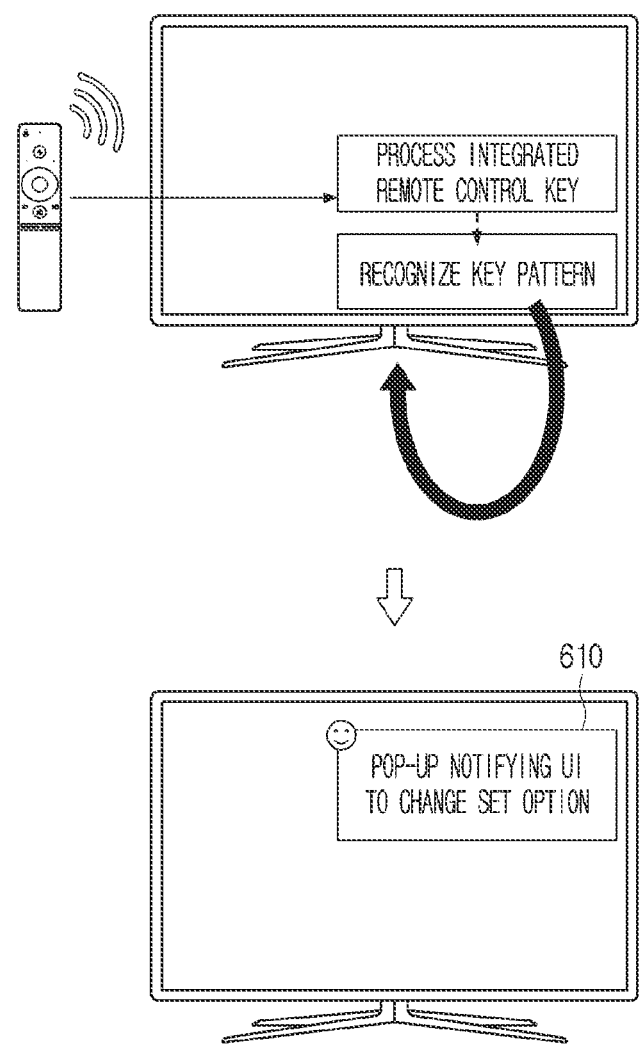
FIG. 6 is a diagram illustrating an example screen for asking whether to store usage pattern information according to various embodiments.

FIG. 6 is a diagram illustrating an example screen for asking whether usage pattern information is stored according to various embodiments.

The processor 130 may request user approval in case of storing the usage pattern information in the memory 120. For example, as shown in FIG. 6, the processor 130 may display a screen 610 asking whether to store the usage pattern information, and store the usage pattern information in the memory 120 in case of receiving the storage approval signal from the remote control device 300 through the communication interface 110.

However, the processor 130 is not limited thereto, and may request the user approval for storing the usage pattern information even not in an operation of generating the usage pattern information. For example, the processor 130 may transmit the usage pattern described with reference to FIG. 5 to the server, and display a screen asking whether to store the usage pattern as the usage pattern information based on the frequency of the usage pattern received from the server. Through this operation, even before the usage pattern information is generated, the processor 130 may provide usage pattern information of other users to the user, thereby inducing the user to select whether to generate the usage pattern information early.

Meanwhile, the processor 130 may allow the screen 610 asking whether to store the usage pattern information to include a message informing how the operation of the electronic apparatus 100 is changed based on the usage pattern information.

Figure 7:
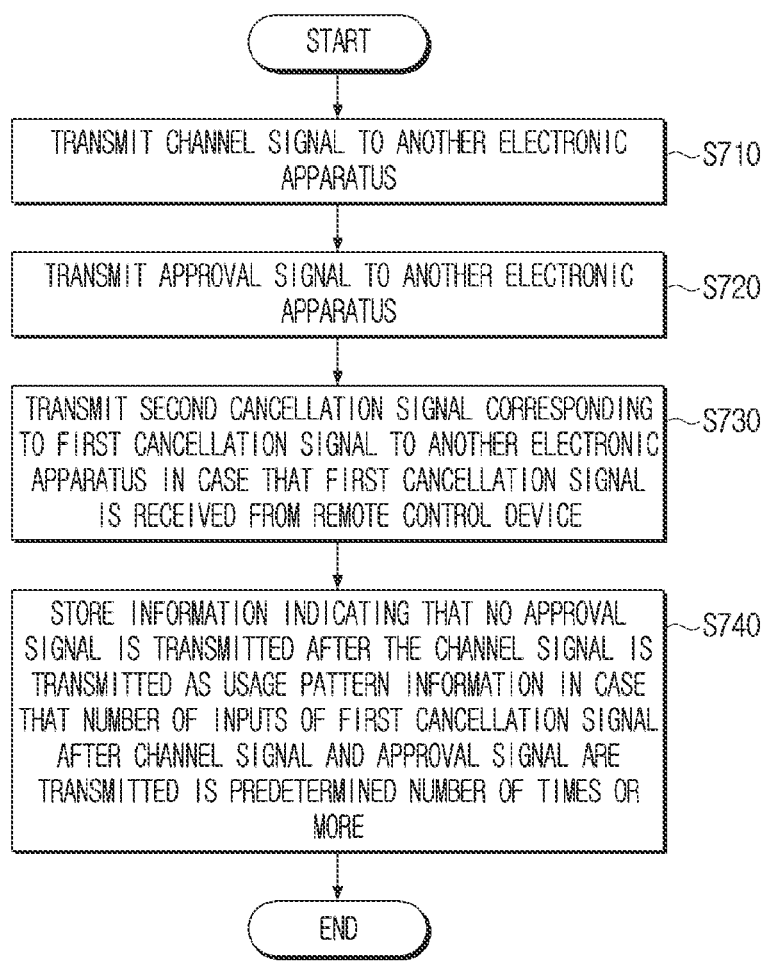
FIG. 7 is a flowchart illustrating an example method of controlling an electronic apparatus according to various embodiments.

FIG. 7 is a flowchart illustrating an example method of controlling an electronic apparatus according to various embodiments.

The method may include transmitting a channel signal to another electronic apparatus (S710). The method may include transmitting an approval signal to another electronic apparatus (S720). The method may then include transmitting a second cancellation signal corresponding to a first cancellation signal to another electronic apparatus in case that the first cancellation signal is received from a remote control device (S730). The method may then include storing information indicating that no approval signal is transmitted after the channel signal is transmitted as usage pattern information in case that the number of inputs of the first cancellation signal after the channel signal and the approval signal are transmitted is a predetermined number of times or more (S740).

In addition, the method may further include displaying at least one thumbnail corresponding to at least one content, wherein in the transmitting of the channel signal to another electronic apparatus (S710), the channel signal indicating a channel corresponding to the thumbnail selected based on a received signal may be transmitted to another electronic apparatus in case that the signal for selecting one of at least one thumbnail is received from the remote control device.

In addition, the method may further include transmitting the channel signal indicating a channel corresponding to the thumbnail selected based on a re-received signal to another electronic apparatus in case that the signal for selecting one of at least one thumbnail is re-received from the remote control device in a state where the usage pattern information is stored, and transmitting no approval signal based on the usage pattern information.

In addition, the method may further include receiving signals based on manipulation of number buttons of a predetermined number or more among the plurality of number buttons included in the remote control device from the remote control device, wherein in the transmitting of the channel signal to another electronic apparatus (S710), signals corresponding to the signals based on the manipulation of the number buttons of the predetermined number or more may be transmitted to another electronic apparatus as the channel signals.

In addition, the method may further include re-receiving the signals based on the manipulation of the number buttons of the predetermined number or more among the plurality of number buttons from the remote control device in the state where the usage pattern information is stored, transmitting signals corresponding to the re-received signals to another electronic apparatus as the channel signals, and transmitting no approval signal based on the usage pattern information.

In addition, a difference in reception time points of the adjacent signals among the signals based on the manipulation of the number buttons of the predetermined number or more may be a predetermined value or less.

In addition, the method may further include displaying a focus on at least one thumbnail corresponding to at least one content and one of at least one thumbnail, and in the transmitting of the channel signal to another electronic apparatus (S710), a channel signal indicating a channel corresponding to a thumbnail where the focus is positioned may be transmitted to another electronic apparatus in case that the focus is displayed on one of at least one thumbnail for a predetermined time or more.

In addition, the method may further include transmitting the channel signal indicating the channel corresponding to the thumbnail where the focus is positioned to another electronic apparatus and transmit no approval signal based on the usage pattern information in case that the focus is displayed on one of at least one thumbnail for the predetermined time or more in the state where the usage pattern information is stored.

In addition, in the storing (S740), a screen asking whether to store the usage pattern information may be displayed, and the usage pattern information may be stored in case that a storage approval signal is received from the remote control device.

In addition, the approval signal may be a signal corresponding to a signal based on at least one of the input button, ok button, or enter button of the remote control device, and the first cancellation signal may be a signal corresponding to a signal based on at least one of the cancel button, back button, return button, or exit button of the remote control device.

In addition, the first cancellation signal may be received from the remote control device according to the first communication standard, and the channel signal, the approval signal, and the second cancellation signal may be transmitted to another electronic apparatus according to the second communication standard.

As set forth above, according to the various embodiments of the disclosure, the electronic apparatus may automatically perform the correction for the unintended operation of another electronic apparatus, thereby improving the user convenience.

In addition, the electronic apparatus may receive the confirmation from the user before generating the usage pattern information for the correction, thereby preventing and/or reducing the erroneous correction in advance.

Meanwhile, according to various embodiments of the disclosure, the various embodiments described above may be implemented by software including an instruction stored in a machine-readable storage medium (for example, a computer-readable storage medium). The machine may be a device that invokes the stored instruction from a storage medium, may be operated based on the invoked instruction, and may include the electronic apparatus (e.g., electronic apparatus A) according to the disclosed embodiments. In case that the instruction is executed by the processor, the processor may directly perform a function corresponding to the instruction, or other components may perform the function corresponding to the instruction under a control of the processor. The instruction may include codes provided or executed by a compiler or an interpreter. The machine-readable storage medium may be provided in the form of a non-transitory storage medium. Here, the term "non-transitory" indicates that the storage medium is tangible without including a signal, and does not distinguish whether data are semi-permanently or temporarily stored in the storage medium.

In addition, according to various embodiments of the disclosure, the method according to the various embodiments described above may be included and provided in a computer program product. The computer program product may be traded as a product between a seller and a purchaser. The computer program product may be distributed in the form of a storage medium (for example, a compact disc read only memory (CD-ROM)) that may be read by the machine or online through an application store (for example, PlayStore™). In case of the online distribution, at least a part of the computer program product may be at least temporarily stored or temporarily provided in a storage medium such as a memory of a server of a manufacturer, a server of an application store or a relay server.

In addition, according to various embodiments of the disclosure, the various embodiments described above may be implemented in a computer or a computer-readable recording medium using software, hardware, or a combination of software and hardware. In some cases, the embodiments described in the disclosure may be implemented by a processor itself. According to software implementation, the embodiments such as the procedures and functions described in the disclosure may be implemented by separate software modules. Each of the software modules may perform one or more functions and operations described in the disclosure.

Meanwhile, computer instructions for performing processing operations of the machines according to the various embodiment of the disclosure described above may be stored in a non-transitory computer-readable medium. The computer instructions stored in the non-transitory computer-readable medium may allow a specific device to perform the processing operations of the device according to the various embodiments described above in case that the computer instructions are executed by a processor of the specific device. A specific example of the non-transitory computer-readable medium may include a compact disk (CD), a digital versatile disk (DVD), a hard disk, a Blu-ray disk, a universal serial bus (USB), a memory card, a read-only memory (ROM), or the like.

In addition, each of the components (for example, modules or programs) according to the various embodiments described above may include a single entity or a plurality of entities, and some of the corresponding sub-components described above may be omitted or other sub-components may be further included in the various embodiments. Alternatively or additionally, some of the components (e.g., modules or programs) may be integrated into one entity, and may perform functions performed by the respective corresponding components before being integrated in the same or similar manner. Operations performed by the modules, the programs or other components according to the various embodiments may be executed in a sequential manner, a parallel manner, an iterative manner or a heuristic manner, and at least some of the operations may be performed in a different order or be omitted, or other operations may be added.

Although the embodiments of the disclosure have been shown and described with reference to various example embodiments hereinabove, the disclosure is not limited to the above-mentioned example embodiments, and may be variously modified by those skilled in the art to which the disclosure pertains without departing from the scope and spirit of the disclosure including the accompanying claims and their equivalents. These modifications should also be understood to fall within the scope and spirit of the disclosure. It will also be understood that any of the embodiment(s) described herein may be used in conjunction with any other embodiment(s) described herein.

What is claimed is:

1. An electronic apparatus comprising:
a communication interface comprising communication circuitry;
a memory; and
at least one processor connected to the communication interface and the memory, and configured to control the electronic apparatus,
wherein the processor is configured to:
control the communication interface to transmit a channel signal to another electronic apparatus,
control the communication interface to transmit an approval signal to the another electronic apparatus,
based on a first cancellation signal being received from a remote control device through the communication interface, control the communication interface to transmit a second cancellation signal corresponding to the first cancellation signal to the another electronic apparatus, and
based on a number of inputs of the first cancellation signal after transmitting the channel signal and the approval signal being a specified number of times or more, store information indicating that no approval signal is transmitted after transmitting the channel signal in the memory as usage pattern information.

2. The apparatus as claimed in claim 1, further comprising a display,
wherein the processor is configured to:
control the display to display at least one thumbnail corresponding to at least one content, and
control the communication interface to transmit the channel signal indicating a channel corresponding to the thumbnail selected based on a received signal to another electronic apparatus based on receiving the signal for selecting one of the at least one thumbnail from the remote control device through the communication interface.

3. The apparatus as claimed in claim 2, wherein the processor is configured to:
control the communication interface to transmit the channel signal indicating a channel corresponding to the thumbnail selected based on a re-received signal to another electronic apparatus based on re-receiving the signal for selecting one of the at least one thumbnail from the remote control device through the communication interface in a state where the usage pattern information is stored in the memory, and
transmit no approval signal based on the usage pattern information.

4. The apparatus as claimed in claim 1, wherein the processor is configured to:
receive signals based on manipulation of number buttons of a specified number or more among the plurality of number buttons included in the remote control device from the remote control device through the communication interface, and
control the communication interface to transmit signals corresponding to the signals based on the manipulation of the number buttons of the specified number or more to another electronic apparatus as the channel signals.

5. The apparatus as claimed in claim 4, wherein the processor is configured to:
re-receive the signals based on the manipulation of the number buttons of the specified number or more among the plurality of number buttons from the remote control device through the communication interface in the state where the usage pattern information is stored in the memory,
control the communication interface to transmit signals corresponding to the re-received signals to another electronic apparatus as the channel signals, and
transmit no approval signal based on the usage pattern information.

6. The apparatus as claimed in claim 4, wherein a difference in reception time points of the adjacent signals among the signals based on the manipulation of the number buttons of the specified number or more is a specified value or less.

7. The apparatus as claimed in claim 1, further comprising a display,
wherein the processor is configured to:
control the display to display a focus on at least one thumbnail corresponding to at least one content and one of the at least one thumbnail, and
control the communication interface to transmit the channel signal indicating a channel corresponding to a thumbnail where the focus is positioned to another electronic apparatus based on the focus being displayed on one of the at least one thumbnail for a specified time or more.

8. The apparatus as claimed in claim 7, wherein the processor is configured to:
control the communication interface to transmit the channel signal indicating the channel corresponding to the thumbnail where the focus is positioned to another electronic apparatus based on the focus being displayed on one of the at least one thumbnail for the specified time or more in the state where the usage pattern information is stored in the memory, and transmit no approval signal based on the usage pattern information.

9. The apparatus as claimed in claim 1, further comprising a display,
wherein the processor is configured to:
control the display to display a screen asking whether to store the usage pattern information, and
store the usage pattern information in the memory based on receiving a storage approval signal from the remote control device through the communication interface.

10. The apparatus as claimed in claim 1, wherein the approval signal comprises a signal corresponding to a signal based on at least one of the input button, ok button, or enter button of the remote control device, and
the first cancellation signal comprises a signal corresponding to a signal based on at least one of the cancel button, back button, return button, or exit button of the remote control device.

11. The apparatus as claimed in claim 1, wherein the processor is configured to:
receive the first cancellation signal from the remote control device according to a first communication standard of the communication interface, and
transmit the channel signal, the approval signal, and the second cancellation signal to another electronic apparatus according to a second communication standard of the communication interface.

12. A method of controlling an electronic apparatus, the method comprising:
transmitting a channel signal to another electronic apparatus;
transmitting an approval signal to the another electronic apparatus;
based on a first cancellation signal being received from a remote control device, transmitting a second cancellation signal corresponding to the first cancellation signal to the another electronic apparatus; and
based on the number of inputs of the first cancellation signal after the channel signal and the approval signal are transmitted being a specified number of times or more, storing information indicating that no approval signal is transmitted after the channel signal is transmitted as usage pattern information.

13. The method as claimed in claim 12, further comprising displaying at least one thumbnail corresponding to at least one content,
wherein in the transmitting of the channel signal to another electronic apparatus, the channel signal indicating a channel corresponding to the thumbnail selected based on a received signal is transmitted to another electronic apparatus based on the signal for selecting one of the at least one thumbnail being received from the remote control device.

14. The method as claimed in claim 13, further comprising:
transmitting the channel signal indicating a channel corresponding to the thumbnail selected based on a re-received signal to another electronic apparatus based on the signal for selecting one of the at least one thumbnail being re-received from the remote control device in a state where the usage pattern information is stored; and
transmitting no approval signal based on the usage pattern information.

15. The method as claimed in claim 12, further comprising receiving signals based on manipulation of number buttons of a specified number or more among the plurality of number buttons included in the remote control device from the remote control device,
wherein in the transmitting of the channel signal to another electronic apparatus, signals corresponding to the signals based on the manipulation of the number buttons of the specified number or more are transmitted to another electronic apparatus as the channel signals.

* * * * *